Oct. 4, 1955　　　H. W. DRIEHAUS　　　2,719,439
POWER TRANSMISSION MECHANISM
Filed Feb. 3, 1953　　　　　　　　　　　　　　　2 Sheets-Sheet 1

INVENTOR.
HERMAN W. DRIEHAUS
BY Murray A. Gleeson
ATTORNEY

Oct. 4, 1955          H. W. DRIEHAUS          2,719,439
POWER TRANSMISSION MECHANISM
Filed Feb. 3, 1953                            2 Sheets-Sheet 2
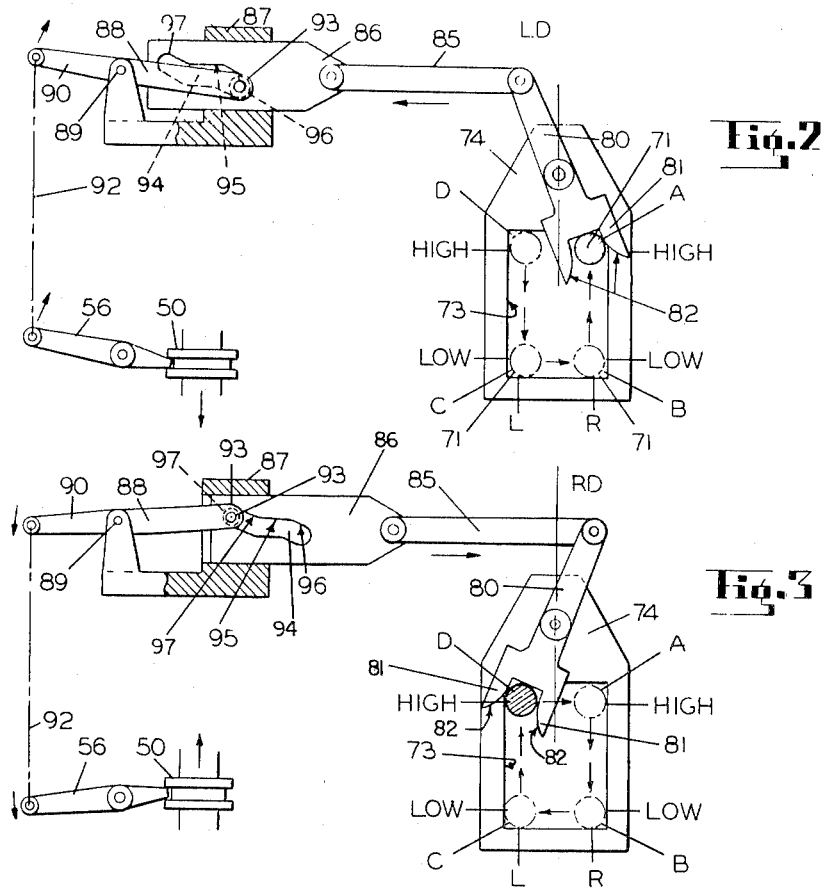
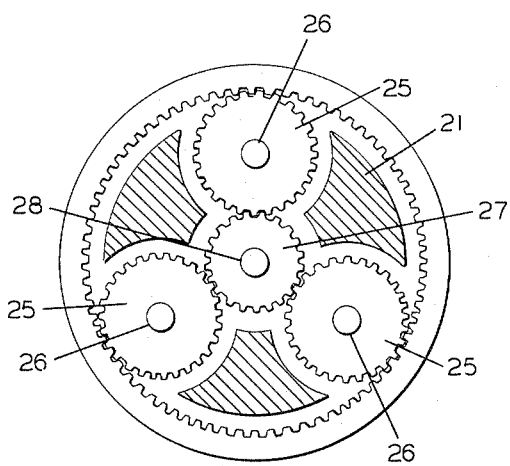
INVENTOR.
HERMAN W. DRIEHAUS
BY
Murray G. Gleeson
ATTORNEY

United States Patent Office 2,719,439
Patented Oct. 4, 1955

2,719,439

POWER TRANSMISSION MECHANISM

Herman W. Driehaus, Chicago, Ill., assignor to Goodman Manufacturing Company, Chicago, Ill., a corporation of Illinois Application February 3, 1953, Serial No. 334,912

3 Claims. (Cl. 74—687)

This invention relates to improvements in dual drive power transmission mechanisms, especially adapted to be driven both by an electric motor and a hydraulic motor.

As is well known, electric motors, particularly series-wound motors, have a relatively high starting torque, but the speed of such motors is usually controlled by a conventional electric controller which affords a relatively small number of variable operating speeds. On the other hand, the starting torque of hydraulic motors is usually limited to the starting fluid pressure, but the speed and reversal of such motors can be controlled by relatively simple conventional fluid pressure control devices, which afford practically infinite speed variations within the limits of the motor.

The present invention is an improvement over the type of dual drive power transmission mechanisms broadly disclosed in my copending application, Serial Number 326,975 filed December 19, 1952, wherein the inherent advantages of the high starting torque of an electric motor, on the one hand, and the simplicity of speed and direction control of a hydraulic motor, on the other, are made use of by employing a planetary gear transmission system, with one element thereof driven by the electric motor and another element driven by the hydraulic motor.

One of the features of a planetary gear transmission system of the type mentioned is the arrangement whereby variations in power output therefrom may be produced by driving the electric and hydraulic motors in opposite directions to give a predetermined range of low-speed output, and driving the two motors in the same direction to give a higher range of speed output. In other words, the speed output is dependent in part upon the reversibility of one of the drive motors with respect to the other motor.

The general type of dual drive transmission mechanism above described is also capable of affording a reversible drive, either by reversing the direction of drive from both drive motors, or by increasing the relative speeds of the two motors in opposite directions beyond the point where their speeds balance each other in the planetary system. In practice, the first-named method of reversal is preferable because it does not require an excessive increase in speed of either of the motors, working against each other.

It has been found, however, that, when a reversible drive is provided from both motors to the transmission device, serious problems arise as to the proper coordination of speed and reversal of the two motors, in order to obtain predetermined resultant speed and direction of drive from the planetary transmission. The operator may easily make a mistake in the proper selection of a starting speed and direction of the two motors with the result that they may be simultaneously thrown into a high-speed driving relationship in the wrong directions, thereby risking damage or breakage to the power transmission gearing and the parts driven therefrom.

Among the objects of the present invention is to provide a mechanical interlock between the electric motor reverse control and the speed and reverse control of the hydraulic motor, so as to insure a predetermined sequence of positions of the manual control devices for starting the two motors at proper directions and relative speeds to effect a slow speed start from the planetary transmission, and to further insure proper changes in speed and direction of drive of the two motors from a standing start to maximum speed to produce the most efficient operation of the system in either direction.

A further object is to prevent driving engagement of the electric motor with the planetary gearing, excepting when the hydraulic motor is being driven in the proper direction and at the proper speed to start the power output at a relatively low speed in the desired direction.

Other objects and advantages of the present invention will appear from time to time as the following description proceeds.

The invention may best be understood by reference to the accompanying drawings, in which:

Figure 2 is a detailed diagrammatic view showing the interlocking control mechanism in the position for driving in one direction;

Figure 3 is a view similar to Figure 2, but showing the interlocking control mechanism in the position for driving in the opposite direction;

Figure 4 is an enlarged detail section taken on line 4—4 of Figure 1.

Figure 1:
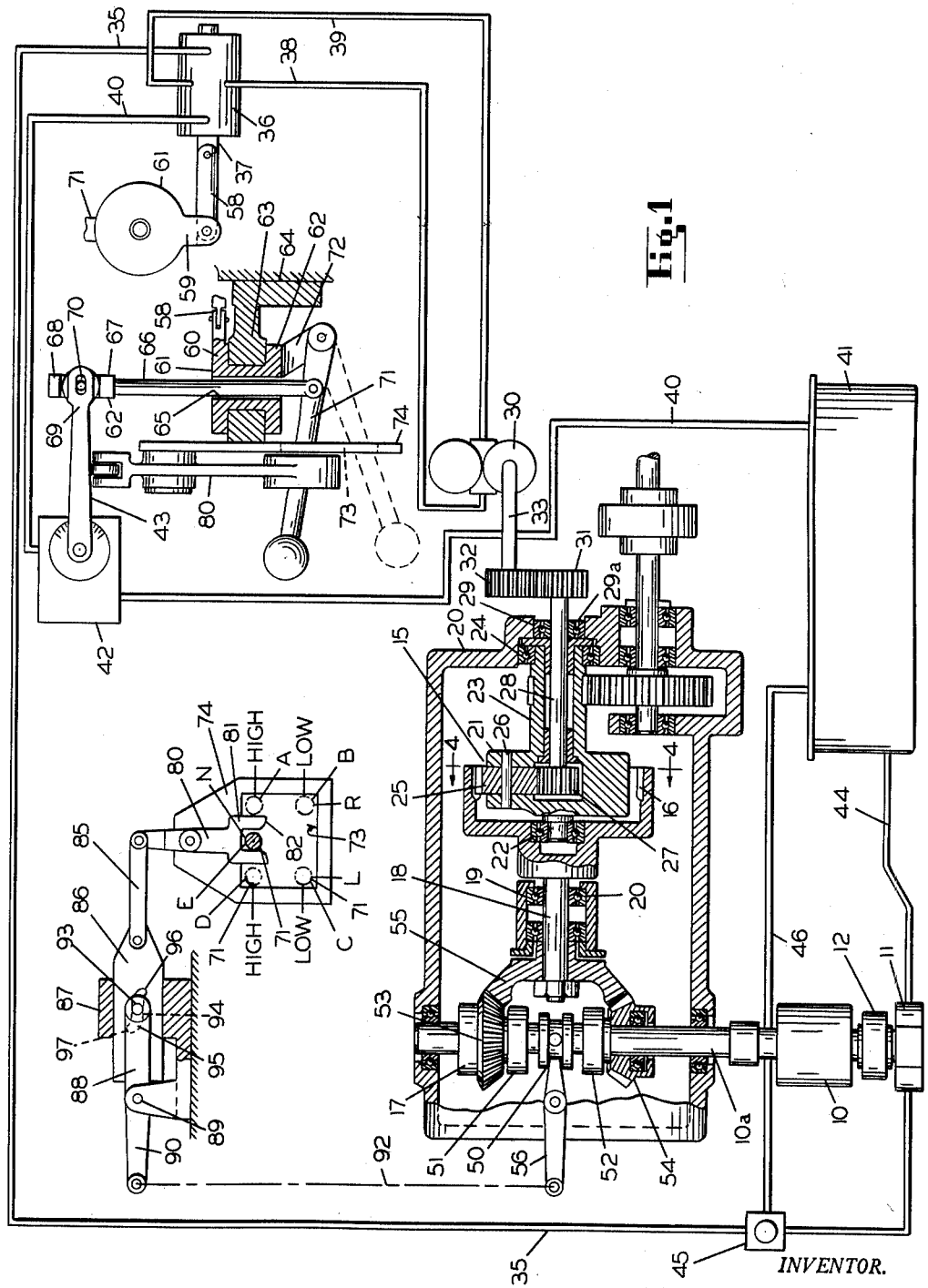
Figure 1 is a diagrammatic view showing one embodiment of my improved transmission system.

Referring now to details of the embodiment of my invention shown in the drawings, 10 indicates an electric motor and 11 indicates a conventional hydraulic pump. In the preferred form shown herein, the pump is driven through reduction gearing 12 from one end of the electric motor 10, although the pump may, under some conditions, be driven by a separate motor, as will presently be set forth.

The power transmission includes a planetary gear assembly indicated generally at 15 having an internal or ring gear 16 driven by the electric motor 10 through a reversing clutch indicated generally at 17, and a shaft 18. The shaft 18 may be journalled in suitable bearings 19 carried in a gear housing 20.

A planetary cage 21 is rotatably mounted concentrically of and within the ring gear 16. In the form shown, said cage has an extended bearing 22 recessed in the hub of said ring gear, and an integral hollow shaft 23 extends in the opposite direction journalled on bearings 24 on support 20. The cage 21 carries a plurality, herein three, of planetary gears 25 rotatably mounted on shafts 26 meshed with a sun gear 27 on another drive shaft 28. The latter shaft extends through the hollow shaft 23 and is journalled on spaced bearings 29, 29a in the latter.

The hollow shaft 23 forms the power output for the drive gear mechanism and carries a pinion 31 thereon meshed with a gear 32 on a driven shaft 33. The drive shaft 28, carrying sun gear 27, is driven from a hydraulic motor 30, which may be of conventional form and driven from pump 11.

The hydraulic motor 30 has suitable control means, such as the conventional speed and reverse control devices shown diagrammatically in Figure 1. In this figure, the pump 11 has a pressure line 35 leading to a reverse valve 36 of any well-known form, having a manual control member 37 shiftable so as to supply pressure selectively to a line 38 leading to one side of the hydraulic motor 30, or to another line 39 leading to the opposite side of said motor. When pressure is being supplied to one side of the lines, as for instance line 38, to drive the hydraulic motor in one direction, the fluid passes into one side of said motor and the other line 39 serves as a return line through the reverse valve 36 to a discharge line 40 and, thence, to tank 41. When the control member 37 of reverse valve 36 is shifted in the opposite direction, the line 38 serves as a return line to reverse valve 36 and, thence, to line 40. A volume control valve 42 is located in the return line 40 to tank. This control valve may be of any conventional form operated by a suitable control lever 43.

The hydraulic circuit is completed by a low-pressure input line 44 connecting the tank with the inlet side of the pump 11. Since both the reverse valve 36 and the volume control valve 42, shown diagrammatically in Figure 1, may be of well-known construction, further details thereof need not be shown or described herein.

A conventional automatic bypass valve 45 may be located in the main pressure line 35 discharging through line 46 to tank, in case of excessive pressure in said main line 35.

The illustrative form of planetary gearing and hydraulic motor control devices above described are substantially the same as those disclosed in my copending application, Serial Number 326,975, mentioned above.

Referring now more particularly to the novel features of a mechanical interlock for the reversible and speed control devices, which forms the principal feature of the present invention, the reversing clutch indicated generally at 17 is interposed between the electric motor 10 and the shaft 18 which drives the ring gear 16 of the planeary. In the illustrative form shown herein, said reversing clutch consists of a conventional arrangement including a sliding collar 50 feathered on shaft 10a driven by the electric motor 10, and adapted to selectively engage right- or left-hand friction disc clutches indicated generally at 51, 52 with beveled pinions 53, 54 respectively. Said beveled pinions are both meshed with a beveled gear 55 fixed on shaft 18. The clutch collar is shifted by a shifter fork 56 of the usual kind so as to provide driving engagement either through the beveled pinion 53 to drive beveled gear 55 in one direction, or through the opposite beveled pinion 54 to drive bevel gear 55 in the reverse direction.

The interlocking control devices for the hydraulic motor 30 are as follows:

The shiftable control member 37 of the hydraulic reverse valve 36 is connected by a link 58 to an arm 59 fixed on an upper flange 60 of a ring member 61. For convenience in illustration, the ring member 61 is shown both in section and in plane view in the diagram Figure 1. Said ring member also is rotatably mounted in an annular supporting bracket 63 integral with a suitable base 64. The ring member 61 has a centrally disposed aperture 65 through which a control rod 66 has endwise slidable movement. The upper end of the control rod 66 has a pair of spaced enlargements 67, 68 between which the forked ends 69 of the control lever 43 of volume control valve 42 are slidably and rotatably engaged. In the form shown, rollers 70, 70 may be mounted on the ends of the forked arms 69 of said control lever 43.

The lower end of the control rod 66 is pivotally connected to a manually operated control lever 71 which has one end pivotally supported on a bracket 72, depending from the lower flange 62 of the ring member 61. The swinging end of the lever 71 extends through an enlarged generally rectangular opening 73 in plate 74 fixed to the bracket 63 adjacent the ring member 61 and substantially parallel to the axis thereof, but on the opposite side from the bracket 72 to which lever 71 is pivoted.

It will be observed at this point that the horizontal swinging movement of the manual control lever 71 will rotate the ring member 61 through a sufficient arc to reverse flow through the hydraulic reverse valve 36 or put it in neutral position, and the up-and-down movement of said manual control lever will change the volume of flow through volume control valve 42.

Figure 1 shows, for example, five different positions in which the manual control lever may be shifted within the rectangular opening 73 of plate 74 to vary the speed and direction of the hydraulic motor. Position A at the upper right-hand corner of said opening may be taken to represent the position of the lever when the hydraulic motor is being driven at its maximum permissible speed in one direction which, for convenience, may be termed toward the right, as indicated by the letter "R" in Figure 1. Position B represents the low-speed position of the lever when it has been shifted to the lower right-hand corner of the opening 73. In this position, the volume control valve may be fully closed, or nearly so, but the reverse valve will still be set for driving toward the right. It will be understood that movement between positions A and B will vary the speed of the hydraulic motor in the right-hand direction.

Position C represents the lever arm 71 when it is shifted to change the hydraulic reversing valve 36 into the left-hand driving position, indicated by the letter "L," wherein the hydraulic motor will be operated at the same low speed as at position B but in the reverse direction. Position D represents the handle 71 for high-speed operation toward the left, at the same speed as when the lever is in position A. Position E represents the lever when it has been shifted to a center position in the opening 73 which, for convenience, may be termed the neutral position, indicated by the letter "N."

An interlocking connection is provided between the manual control lever 71 in its varied permissible positions and the shifter fork 56 which controls the reversing clutch 17, in order to insure the proper sequence of movements of the manual control lever for starting the planetary output drive member at low speed in either direction. This interlocking connection includes an arm 80 pivotally mounted on the upper part of the plate 74 and having widely spaced bifurcations 81, 81 on its lower end in position to be swung selectively across the upper portion of the opening 73 from one extreme position, wherein the two bifurcations 81, 81 are moved into position to receive the lever 71 in position A, or to the opposite extreme position wherein the bifurcations 81, 81 are moved into position to receive the lever 71 in position D, as shown diagrammatically in Figures 2 and 3. The lower ends of the bifurcations 81, 81 diverge outwardly at 82, 82 so that, in either of said extreme positions of said arm, the lever 71 may be readily moved upwardly from its positions B or C into the positions A or D, respectively, as the case may be.

The upper end of the arm 80 is connected by a link 85 to a lost-motion device, herein consisting of a block 86 slidably mounted in fixed support 87. A lever 88 is pivotally connected at 89 to the support 87, having one end 90 connected by suitable linkage 92 to the outer end of the shifter fork 56 of the reversing clutch 17. The opposite end of lever 88 has a pin 93 movable along a cam-like slot 94 extending longitudinally of the block 86. A central portion 95 of said slot extends generally in the same direction as the lever arm 88 but the outer ends of said slot are curved in opposite directions from each other, as indicated at 96 and 97.

This shape of the slot is such that the shifter fork 56 of the reversing clutch 17 will be actuated for fully engaging one or the other clutch only when the arm 80 is positively swung either to its extreme left- or right-hand position.

The use and operation of the interlocking mechanism may now be described as follows:

It will be understood that the electric motor 10 is preferably arranged to drive the internal gear 16 of the planetary transmission at a substantially constant speed so as to impose a greater torque on the intermediate cage member 21 than the torque imposed on said cage member from the hydraulic motor 30 acting through the sun gear 27. A ratio of 4 to 1 between the maximum effective torque from the electric motor and the maximum effective torque from the hydraulic motor may be cited as an example. In such cases, it is desirable to provide the same gear ratio of 4 to 1 between the internal gear 16 and the sun gear 27 in order to maintain an approximate balance of the driving torques effective on the planetary cage.

Assuming that the electric motor drives the ring gear in one direction at 400 R. P. M. while the sun gear is being driven in the opposite direction at 1600 R. P. M., the planetary cage will be stationary due to the 4-to-1 ratio above mentioned which causes the planetary gears to rotate as idlers. When the speed of the sun gear is reduced below 1600 R. P. M. in a direction opposite to that of the ring gear, the planetary cage will then rotate in the same direction as the ring gear at a speed corresponding to the summation of the two driving speeds. When the sun gear is brought to a standstill (by shutting off all pressure by the volume control valve 36), the speed of the planetary will be increased to 320 R. P. M. When the sun gear is reversed so as to rotate in the same direction as the ring gear, the speed of the sun gear is then added to that of the ring gear to produce further increases in the speed of the planetary cage.

When the reversing clutch 17 is operated to reverse the direction of rotation of the ring gear, the same variations in direction and speed of rotation of the planetary cage can be obtained in the opposite direction, if the directions of drive from the hydraulic motor are also changed in the reverse order. It will be observed, however, that in practice it is very difficult and confusing for the operator to make the proper selection of speed and direction of drive from the two motors in order to obtain the desired resultant speed and direction of drive from the planetary transmission, if he must rely upon the independent speed and direction controls of the two motors. The novel form of interlock above described overcomes this difficulty in the following manner:

The manual control lever 71 is normally maintained in a neutral position when the planetary transmission is inoperative. The forked arm 80 is likewise in its center or neutral position with respect to the plate aperture 73 so that the reversing clutch 17 is in neutral or disengaged position.

The proper operating sequences for effecting right- or left-hand drive from the planetary transmission may now be described as follows:

When the manual control lever 71 is in its neutral or inoperative position E, the interlocking arm 80 will be in its center or neutral position, as will also be the shifter fork 56 of the reversing clutch 17, as shown in Figure 1, wherein the electric motor 10 may be started without transmitting power to the internal gear 16 of the planetary transmission.

Assuming that the operator wishes to effect a drive through the planetary transmission toward the left, he will shift the manual control lever 71 to position A in Figure 2. This movement will carry the arm 80 to its extreme left-hand position shown in full lines in this figure, which position, for convenience, may be termed the left-hand driving position, as indicated by the letters "LD." This movement of the arm 80 to the LD position will cause the shifter fork 56 of the reverse clutch 17 to be thrown in a direction to engage the electric motor 10 with the gear 16 so as to drive the latter in the left-hand direction. As previously explained however, the hydraulic motor 30 will be driven in the right-hand direction at its maximum speed when the lever 71 is in position A.

Starting from position A, the manual control lever 71 can be shifted consecutively through positions B and C to position D without moving the arm 80 from its extreme left-hand position LD, thus giving any desired variation in speed through the planetary transmission from a substantially stationary start at position A to its maximum speed, attained at position D. The arrangement is such, however, that the lever 71 cannot then be moved directly from position D to position A because of the intervening bifurcation 81 of arm 80. Instead, the operator must move the control lever 71 in a reverse sequence, through positions C and B, and thence to starting position A, with a corresponding gradual reduction in speed of the transmission output toward the left, before he can undertake to reverse the direction of drive through the transmission. This reversal may then be accomplished by shifting the control lever 71, with arm 80, to the extreme right-hand drive position indicated at RD in Figure 3.

When the arm 80 is shifted to its right-hand drive position RD, the shifter fork 56 of the reversing clutch 17 will also be actuated through the connecting linkage, to throw the reversing clutch into gear with the internal gear of the planetary transmission in the reverse direction, to drive said internal gear toward the right. The control lever 71 will then be in position D, for starting the transmission output toward the right, and must be moved consecutively through positions C and B to position A to increase the output speed from the transmission from minimum to maximum. As before, the lever 71 cannot be shifted directly from A to D without retracing the movement of said lever through positions B and C.

As a result of the interlocking mechanism just described, the operator is automatically apprised of the proper sequence of movements of the manual control lever 71 necessary for producing a drive from the planetary transmission in the proper direction, and always from a standing start, rather than unintentionally selecting some intermediate driving speed which might put an excessive load on the transmission or the parts driven thereby; as for instance, if the speeds of the two motors should suddenly be changed with respect to each other to produce a drive in an undesired speed or direction. My improved interlock also makes it necessary to disengage the reverse clutch 17 whenever it is desired to change the direction of drive from the planetary transmission, so that the electric motor can not be accidentally left in gear for driving in the wrong direction when such change in direction of drive is desired.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. For use with a power transmission mechanism adapted to be driven by two motors, one of which has both reversing and speed control members, and the other of which is selectively connectable to the transmission by a reversible clutch mechanism having a control member movable into opposite driving positions, the improvement which consists in a single manual control lever operatively connected to both the speed and reversing control members of the first-named motor, said lever being swingable in one direction for affording selective adjustment of said speed control member into a plurality of speed controlling positions and also being swingable in a transverse direction for affording selective adjustment of the reversing control member into two opposite drive positions, and an interlocking connection between said lever and the control member of said reversible clutch mechanism for affording shifting of the reversing control member by said lever into either one of its two opposite drive positions while said lever is in either of its two high-speed reverse driving positions but preventing said lever from being shifted from either one of its high-speed reversing positions to the opposite high-speed reversing speed position without first shifting said lever through an intermediate low-speed position.

2. For use with a power transmission mechanism adapted to be driven by two motors, one of which has both reversing and speed control members, and the other of which is selectively connectable to the transmission by a reversible clutch mechanism having a control member movable into opposite driving positions, the improvement which consists in a single manual control lever operatively connected to both the speed and reversing control members of the first-named motor, said lever being swingable in one direction for affording selective adjustment of said speed control member into a plurality of speed controlling positions and also being swingable in a transverse direction for affording selective adjustment of the reversing control member into two opposite drive positions, and an interlocking connection between said lever and the control member of said reversible clutch mechanism, including an arm having a forked end adapted to receive said lever, whereby said arm is shiftable by said lever into either one of two clutch-reversing positions coincident with the two high-speed reverse-driving positions of said lever, said lever being removable from said forked end in either high-speed clutch-reversing positions of the latter to insure shifting of said lever first through a low-speed position below said fork before shifting into the high-speed opposite drive position, and said forked end being adapted to prevent shifting of said lever from the latter high-speed position to its initial high-speed position, excepting by first shifting said lever through an intermediate low-speed position below said fork.

3. In a control mechanism in accordance with claim 2, adapted for use with a reversible clutch mechanism having an intermediate neutral position in addition to opposite driving positions, the improvement which consists in providing a lost-motion device in the connection between the forked arm of the control member of the reversible clutch mechanism.

References Cited in the file of this patent

UNITED STATES PATENTS

| | | |
|---|---|---|
| 2,445,716 | Sternberg | July 20, 1948 |
| 2,524,487 | Stevens | Oct. 3, 1950 |
| 2,564,393 | Clancy | Aug. 14, 1951 |
| 2,578,015 | Reinhard | Dec. 11, 1951 |
| 2,582,895 | Young | Jan. 15, 1952 |